(12) United States Patent
Shore et al.

(10) Patent No.: US 8,240,329 B1
(45) Date of Patent: Aug. 14, 2012

(54) FLUID CONTROL VALVE

(75) Inventors: Craig Shore, Grinnell, IA (US); Aron Fleischmann, Huxley, IA (US)

(73) Assignee: Robust Systems Solutions, LLC, Huxley, IA (US)

( * ) Notice: Subject to any disclaimer, the term of this patent is extended or adjusted under 35 U.S.C. 154(b) by 470 days.

(21) Appl. No.: 12/618,290

(22) Filed: Nov. 13, 2009

Related U.S. Application Data

(60) Provisional application No. 61/199,217, filed on Nov. 14, 2008, provisional application No. 61/199,219, filed on Nov. 14, 2008.

(51) Int. Cl.
*F16K 17/26* (2006.01)
(52) U.S. Cl. .... 137/493.9; 251/65; 251/117; 137/513.7; 137/516.27; 137/517
(58) Field of Classification Search ............ 251/65, 251/129.02, 117; 137/493, 493.9, 511, 513.3, 137/516.25, 517, 516.27, 513.7, 512.2, 512.3
See application file for complete search history.

(56) References Cited

U.S. PATENT DOCUMENTS

| | | | |
|---|---|---|---|
| 2,569,316 A * | 9/1951 | Jerman | 137/517 |
| 2,929,399 A | 10/1956 | MaGowan, Jr. | |
| 2,939,475 A * | 6/1960 | Roach | 137/155 |
| 3,437,065 A * | 4/1969 | Robbins, Jr. | 114/330 |
| 3,861,414 A * | 1/1975 | Peterson, II | 137/512.3 |
| 3,977,430 A | 8/1976 | Bushee | |
| 4,030,520 A | 6/1977 | Sands | |
| 4,105,044 A | 8/1978 | Davitt | |
| 4,494,570 A | 1/1985 | Adkins | |
| 4,539,959 A | 9/1985 | Williams | |
| 4,830,046 A | 5/1989 | Holt | |
| 4,928,725 A | 5/1990 | Graves | |
| 5,069,420 A | 12/1991 | Stobbs et al. | |
| 5,092,365 A | 3/1992 | Neff | |
| 5,186,021 A * | 2/1993 | Keller | 62/511 |
| 5,211,192 A | 5/1993 | Jorgensen | |
| 5,280,806 A * | 1/1994 | Glazebrook | 137/517 |
| 5,282,645 A | 2/1994 | Spakowski et al. | |
| 5,320,136 A * | 6/1994 | Morris et al. | 137/528 |
| 5,331,999 A | 7/1994 | Jorgensen | |
| 5,439,022 A * | 8/1995 | Summers et al. | 137/102 |
| 5,613,518 A | 3/1997 | Rakieski | |
| 5,960,822 A | 10/1999 | Matuschka et al. | |
| 6,216,729 B1 | 4/2001 | Hambly et al. | |
| 6,298,873 B1 | 10/2001 | LeVey et al. | |
| 6,668,857 B2 | 12/2003 | Gagnon et al. | |
| 6,742,540 B2 | 6/2004 | Kim | |
| 6,789,567 B2 * | 9/2004 | Meyer | 137/517 |
| 6,983,923 B2 | 1/2006 | Fukui et al. | |
| 7,069,946 B2 | 7/2006 | Clare, Jr. | |
| 7,086,413 B2 * | 8/2006 | Yu et al. | 137/493.9 |
| 7,114,512 B2 | 10/2006 | Hsiao | |
| 7,168,597 B1 * | 1/2007 | Jones et al. | 222/402.2 |
| 7,234,529 B2 | 6/2007 | Surjaatmadja | |
| 7,237,569 B2 | 7/2007 | Shieh | |
| 7,255,323 B1 * | 8/2007 | Kadhim | 251/65 |
| 7,318,357 B1 | 1/2008 | Troccoli et al. | |
| 7,640,944 B2 * | 1/2010 | Zakai et al. | 137/14 |

\* cited by examiner

*Primary Examiner* — John Fristoe, Jr.
*Assistant Examiner* — Jessica Cahill

(57) ABSTRACT

Disclosed is an apparatus for providing in-line, three-state, dual flow metering, high pressure relief, for use in a system utilizing compressible or incompressible media, which includes a centrally disposed magnetically homed ball with opposing axially aligned ball mating valve seats, with a high pressure relief spring deployed to control the pressure necessary to trigger high pressure relief.

20 Claims, 4 Drawing Sheets

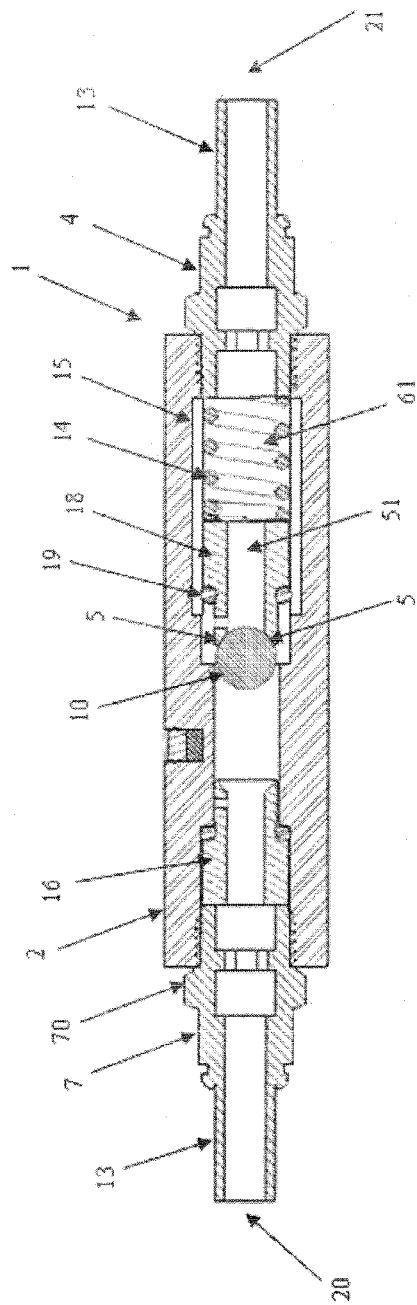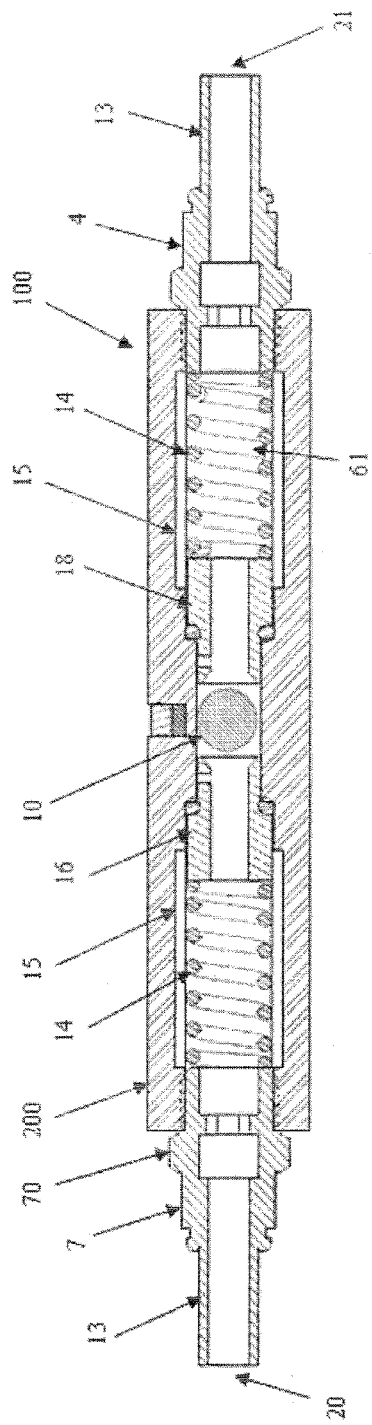
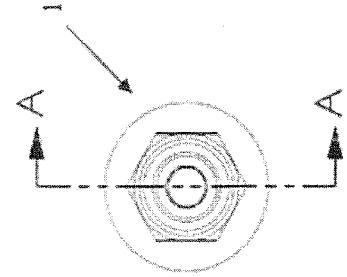
FIG. 7
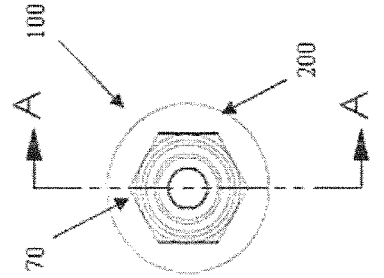
FIG. 7
FIG. 6
FIG. 8

FLUID CONTROL VALVE

CROSS REFERENCE TO RELATED APPLICATIONS

This application relates to and claims the benefit of two provisional applications filed on Nov. 14, 2008, and having application Nos. 61/199,217 and 61/199,219 and entitled "PNEUMATIC DAMPER" and "FLUID CONTROL VALVE" respectively, by the same inventors. These provisional applications are incorporated herein in their entirety by this reference. This application also relates to an application entitled "PNEUMATIC DAMPER" by the same inventors which is filed on even date herewith. This application is also incorporated herein in its entirety by this reference.

TECHNICAL FIELD OF THE INVENTION

The field of technology for this invention is the broad area of fluid control. The invention provides a multifunctional apparatus which allows bi-directional flow to be controlled, using a three-state configuration.

BACKGROUND

Air seat suspension systems are expected to respond to relatively high amounts of often sudden and sometimes erratic forces. The needs of the system frequently change, depending upon key variables, such as driver weight and the vehicle load. The environmental conditions inside a cab of a parked vehicle can vary dramatically over a short time, with temperature changes of 100 degrees F. in under an hour. Some prior art systems are too costly for widespread deployment.

Consequently, there is a need for a low cost, rugged, adjustable, three-state, bi-directional flow control device.

SUMMARY OF THE INVENTION

It is an object of the present invention to provide an economical rugged, adjustable, three-state, bi-directional flow control device.

It is a feature of the present invention to include a magnetically homed ball with adjustable magnetic forces.

It is an advantage of the present invention to allow a simple screw adjustment to make changes in the system setting.

It is a feature of the present invention to include an electromagnetically homed ball, with real time electronic control of the system.

It is another advantage of the present invention to provide the system with real time electronic control.

It is another feature of the present invention to include interchangeable orifices and springs.

It is another advantage of the present invention to allow for relatively easy reconfiguration of internal system parameters.

The present invention is designed to achieve the above object, contain the previously mentioned features and enjoy the stated advantages.

Accordingly, the present invention is:
a valve comprising:
a substantially cylindrical valve body comprising a central fluid channel having a plurality of internal sections with each of said plurality of internal sections having a different diameter dimension;
a substantially spherical flow stopper;
a first piston configured to slide in said central fluid channel and sized to create an airflow permitting gap between said first piston and said valve body;
said first piston comprising:
a member with a central void and a seat configured to at least partially mate with said spherical flow stopper;
a port extending through said first piston and coupling said airflow permitting gap with the central void in said member;
a first spring disposed in said valve body to resist movement of said first piston along said central fluid channel;
a first pressure relief channel disposed in said valve body which is configured to provide a passage for airflow only when said first piston has compressed said first spring by a first predetermined distance;
wherein said first piston further comprises:
a ball mating section having a first diameter;
a first displacement resistance mating section having a second diameter which is larger than said first diameter;
an "O" ring seal disposed around said ball mating section adjacent to said first displacement resistance mating section, configured to prevent airflow except when said first piston has compressed said spring by said first predetermined distance; and
a magnet disposed in said valve body configured for retaining said spherical flow stopper in a predetermined location in the absence of airflow around said spherical flow stopper.

BRIEF DESCRIPTION OF THE DRAWINGS

FIG. 2 is a cross-sectional view of the single ball and single spring valve assembly taken on line A-A of FIG. 1, where the internal components are at State I.

FIG. 3 is an enlarged detailed view of the single ball and single spring valve assembly taken inside detail Circle B of FIG. 2.

FIG. 7 is an end view of the single ball and double spring valve assembly of the present invention.

FIG. 8 is a cross-sectional view of the single ball and double spring valve assembly taken on line A-A of FIG. 7, where the internal components are at State I.

DETAILED DESCRIPTION

The invention is applicable for both compressible and incompressible fluid media; however, this disclosure pertains to the device being used within a compressed air circuit. In a particular application, the invention bodes well as a design solution for use in a seat suspension system.

Figure 1:
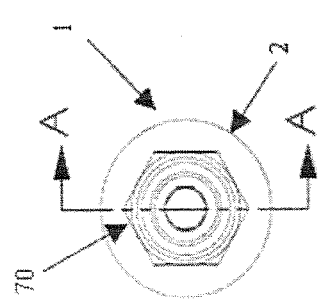
FIG. 1 is an end view of a single ball and single spring valve assembly of the present invention.

Now referring to the drawings wherein like numerals refer to like matter throughout and more specifically referring to FIGS. 1, 2 and 3, there is shown the valve assembly generally designated 1 of the present invention, which contains a valve body 2 with a cylindrical communication passage 3 of a predetermined diameter and length, which ultimately connects port A 20 of the valve assembly 1 with port B 21 of the valve assembly 1. Valve body 2 contains a central fluid channel with a plurality of internal sections with variable width characteristics or diameter dimension which corresponds to a variable width characteristic of communication passage 3.

Located within the communication passage 3 is a flow seal device, ball or spherical flow stopper 10 which may be of a controlled spherical dimension and is smaller than the thinnest portion of the communication passage 3. Located at a position tangential to the flow seal device or ball 10 and within the valve body 2 is a magnet 11 for retaining the flow seal device 10 on the predetermined location. The magnet 11 is located via a magnet adjustment screw 12 such that the holding strength of the magnet 11 on the flow seal device 10 can be varied. The magnet 11 serves to retain the flow seal device 10 on location during events of minimal airflow State I described below. Additionally, the magnet 11 serves to "home", or return, the flow seal device 10 back to the initial location after having been unseated due to airflow characteristics described below as State II and State III, respectively. This action of the magnet 11 assists the flow seal device 10 from simply pinging between the flow seal device seats 5 and 8, also later discussed. This process supports the operation of the valve assembly 1 to more quickly achieve steady-state airflow characteristics.

Located on the port A 20 side of the valve assembly 1 is fitting 7, which ultimately connects the communication tubing 13 with the communication passage 3. Fitting 7 has a wrench mating surface 70 thereon to assist in the insertion of fitting 7 into valve body 2. Located immediate to fitting 7 opposite the communication tubing 13 is piston 16 which embodies a member with a central void, flow seal device seat 8, orifice or port 9 and piston seal 17.

Located on the port B 21 side of the valve assembly 1 is fitting 4, which ultimately connects the communication tubing 13 with the communication passage 3. Located immediate to fitting 4 opposite the communication tubing 13 is an internal pressure regulating spring 14 and piston 18 which embodies flow seal device seat or piston seat 5, orifice 6 and piston seal 19. Note that the figures show piston 18 touching the inside wall of communication passage 3; it should be understood that a gap or airflow permitting gap of a predetermined dimension could exist between the piston 18 and the communication passage 3, especially between the seat 5 and the wall of the communication passage 3. This will enable a certain amount of airflow to occur.

A method to carry out the invention is herein described. The functionality of the invention is best described by three independent states.

State I. Steady-State Airflow Between A to B

FIGS. 2, 3, 8 and 10

When airflow is freely communicated between port A 20 and port B 21 with a minimal pressure drop across the flow seal device 10, the magnet 11 retains the flow seal device 10 on location and promotes full flow between port A 20 and port B 21. The flow seal device 10 remains on location of the magnet 11 until the time instant when a pressure and flow gradient across the flow seal device 10 is developed which becomes increasingly large enough to overcome the holding strength of the magnet 11, causing the flow seal device 10 to move within the communication passage 3 toward either flow seal device seat A 8 discussed below with respect to FIG. 4 and State III or flow seal device seat B 5 discussed below with respect to FIG. 5 and State II. In the Steady State, State I, the airflow characteristics within the valve assembly 1 are controlled by the effective orifice area created due to the diametrical differences of flow seal device 10 and the communication passage 3.

State II. High Pressure Airflow from A to B

Figure 5:
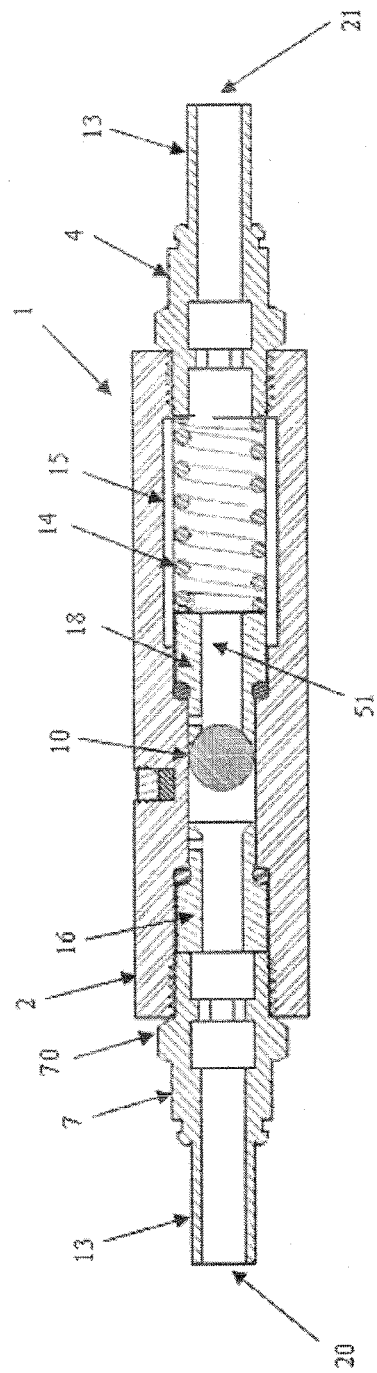
FIG. 5 is a cross-sectional view of the single ball and single spring valve assembly taken on line A-A of FIG. 1, where the internal components are at State II.
Figure 6:
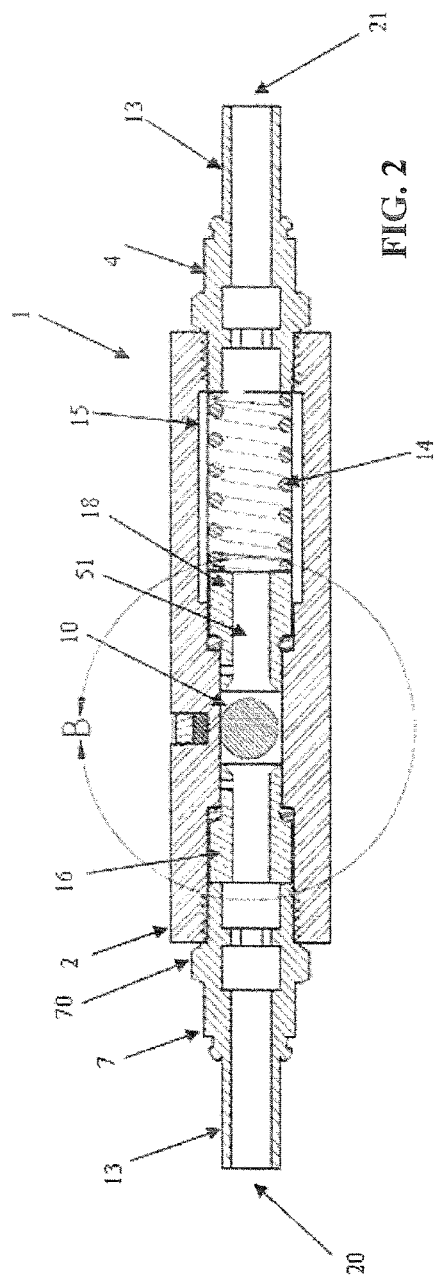
FIG. 6 is a cross-sectional view of the single ball and single spring valve assembly taken on line A-A of FIG. 1, where the internal components are at State II with activated pressure relief.

Now also referring to FIG. 5, when airflow is moving in the direction from port A 20 toward port B 21 with sufficient flow and pressure to overcome the holding strength of the magnet 11, the flow seal device 10 becomes seated against the flow seal device seat B 5 of piston B 18. When the flow seal device 10 becomes fully seated within flow seal device seat B 5, the airflow is primarily restricted to flowing between the flow seal device seat B 5 and the wall in valve body 2 defining communication passage 3 and then through the orifice B 6 as the piston seal B 19 prohibits further airflow around the piston B 18. Note: depending upon the predetermined goodness of the seal between seat 5 and ball 10, some air may be permitted to flow directly into the central void 51. The restricted air flows through orifice B 6 into central void 51 and fitting B 4 into the communication tubing 13 at port B 21. In this state, the directional airflow characteristics are controlled by the effective orifice area of the orifice B 6, thus controlling the degree of pressure developed within the port A 20 side of the valve assembly 1. Furthermore, in this state, and now referring to FIG. 6, if the air pressure developed due to the airflow restriction is great enough to overcome the force of the internal pressure regulating spring 14 acting on piston B 18, piston B 18 will travel in the direction toward fitting B 4 until piston seal B 19 travels beyond the opening of internal pressure regulating channel or pressure relief channel 15. Internal pressure regulating channel 15 is a keyway-type slot in the valve body 2. At this instant, the generated air pressure immediately releases past piston seal B 19, flowing into the larger cavity created by the internal pressure regulating spring 14 and internal pressure regulating channel 15 and through fitting B 4 and communication tubing 13 located at port B 21. This immediate airflow maintains until the generated air pressure decreases to the state, whereby the force of the internal pressure regulating spring 14 acting on piston B 19 is now greater than the air pressure.

State III. High Pressure Airflow from B to A

Figure 4:
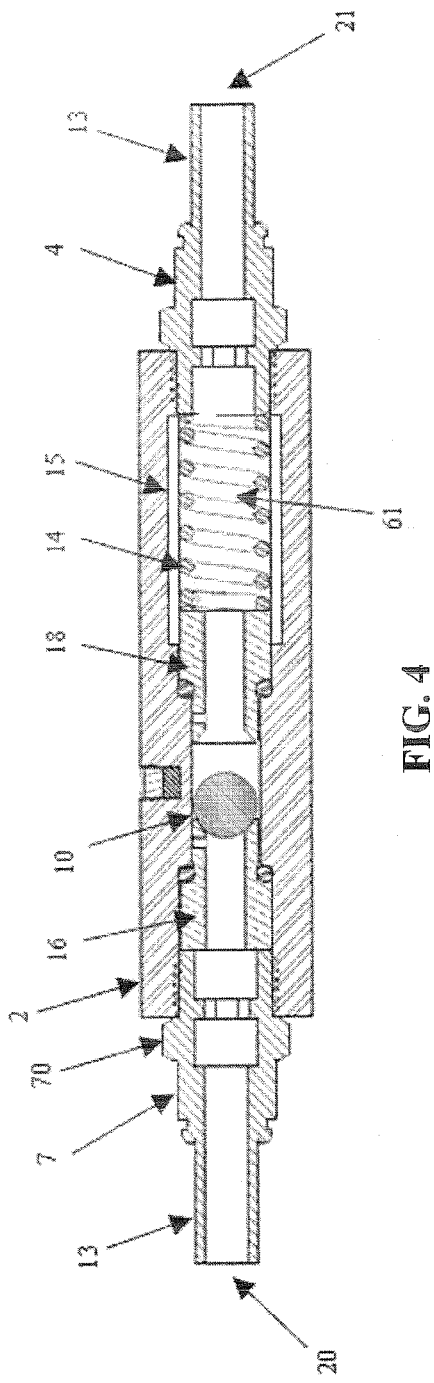
FIG. 4 is a cross-sectional view of the single ball and single spring valve assembly taken on line A-A of FIG. 1, where the internal components are at State III.

Now also referring to FIGS. 1, 3 and 4, when airflow is moving in the direction from port B 21 toward port A 20 with sufficient flow and pressure to overcome the holding strength of the magnet 11, the flow seal device 10 becomes seated against the flow seal device seat A 8 of piston A 16. When the flow seal device 10 becomes fully seated within flow seal device seat A 8, the airflow is restricted to flowing through the orifice A 9 as the piston seal A 17 prohibits airflow around the piston A 16. The restricted air flows through orifice A 9 and fitting A 7 into the communication tubing 13 at port A 20. In this state, the directional airflow characteristics are controlled by the effective orifice area of the orifice A 9, thus controlling the degree of pressure developed within the port B 21 side of the valve assembly 1.

Other embodiments of the invention exist with variations such as with a dual direction flow pressure relief component. This can be carried out without losing the intent of this invention by incorporating either a single or multiple internal pressure regulating spring(s) 14, respectively. See FIGS. 8 and 10.

After studying the invention, it will become evident that the design allows flexibility for a specific application. State I can be controlled by changing the effective orifice areas between the flow seal device 10 and communication passage 3 changing the size and geometry of flow seal device 10, as well as the length for which the flow seal device 10 must travel. Additionally, the holding strength of the magnet 11 can be set to allow a weaker or stronger release of the flow seal device 10. Furthermore, the magnet 10 can be replaced with an electromagnet allowing further flexibility and control, including real time electronic control, to be induced into the invention. It also recognized that the airflow and pressure response within the valve assembly 1 is a primary function of the corresponding changes in the in-line streaming airflow characteristics and can be used to provide intelligence for an electronic controller. The intelligence could be used for communication with the electromagnet, as well as other controllable parameters to provide enhanced control over the valve assembly 1 system response.

States II and III can be independently controlled by changing the airflow restrictions developed by orifice A 9 and orifice B 6. Interchangeable sleeves used in such orifices could be preferred in some embodiments. Furthermore, the goodness of seat between the flow seal device 10 and the flow seal device seat A 8 or flow seal device seat B 5, respectively, govern airflow characteristics.

The quality of the seat between the flow seal device 10 and the flow seal device seat A 8 or flow seal device seat B 5 can also be governed by the geometry of the flow seal device 10. Furthermore, the geometry can also promote the ability to more easily bias the flow seal device 10 toward either flow seal device seat A 8 or flow seal device seat B 5, especially when incorporating an electromagnet control line 121 and electromagnet controls 120 of FIG. 3 into the design. Note electromagnets could be used for magnet 11, as well as other places in the valve body 2 and even in the seats 5 and 8. Additionally, the flow seal device 10 geometry can be such that the flow seal device 10 may include a flow seal device core 110 that is either magnetic or non-magnetic. By using a flow seal device core, additional control and goodness of seat can be achieved. Furthermore, an alternate material for the flow seal device 10 or the flow seal device exterior 112 may be of a softer material than the seat to gain additional positive seating characteristics, such as that commonly found in industrial valve and valve seats.

The materials and processes used within the invention are standard to the industry relating to fluid control valves. For example, the valve body 2 may be machined from brass or plastic, or injection molded from plastic. Likewise, the piston A 16 and piston B 18 can be machined from brass or plastic, or injection molded. If manufactured from metal, brass is attractive for many reasons; i.e., relatively low cost, ease of machining, etc.; however, other metals and composite materials could be equally suitable.

It is also recognized that embodiments exist where the invention can be incorporated with other fluid control components, such as that of a height control valve commonly found within suspension systems used for cabs, chassis, etc.

Now referring to FIG. 7, there is shown an end view of the valve 100 of the present invention with valve body 200. Valve body 200 may be identical in outer appearance and similar in construction to valve body 2.

Now referring to FIG. 8, there is shown valve assembly 100 taken on line A-A of FIG. 7, which shows the ball in State I and shows dual internal pressure regulating spring(s) 14, where each spring and piston function similar to that shown and discussed above with respect to FIG. 6.

Figure 9:
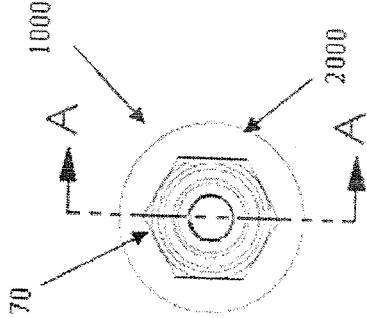
FIG. 9 is an end view of a double ball and single spring valve assembly of the present invention.

Now referring to FIG. 9, there is shown an end view of a valve assembly 1000 of the present invention with a valve body 2000.

Figure 10:
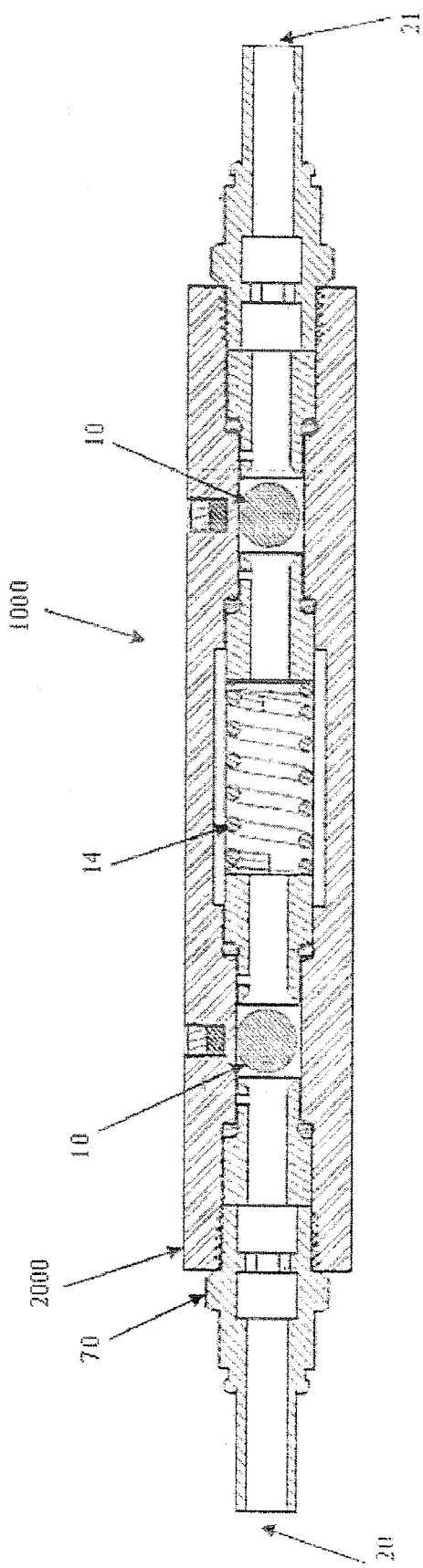
FIG. 10 is a cross-sectional view of the double ball and single spring valve assembly taken on line A-A of FIG. 9, where the internal components are at State I.

Now referring to FIG. 10, there is shown the valve 1000 taken on line A-A of FIG. 9; valve 1000 includes dual balls 10 and a common central internal pressure relief spring 14.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:
1. A valve comprising:
a valve body having a substantially cylindrical shape with a longitudinal dimension which defines a longitudinal axis extending between and connecting a first port at a first end and a second port at a second end;
said valve body having a hollow interior along said longitudinal axis;
said hollow interior of said valve body having a plurality of sections comprising a first section, a central section and a second section; said central section has a central diameter which is smaller than a first diameter of said first section and a second diameter of said second section; said first diameter and said second diameter being substantially identical;
a metallic ball disposed in said central section;
a first sliding piston, having a first seat portion with a first seat diameter smaller than said central diameter and a first spring portion with a first spring portion diameter which is larger than said central diameter and smaller than said first diameter; said first sliding piston disposed in said hollow interior between said metallic ball and said first end;
said first sliding piston comprising a first central void having a first void axis which is substantially co-located with said longitudinal axis;
said first sliding piston having a first orifice through said first seat portion extending a spot on a first outside circumference of said first seat portion into said first central void;
a first "O" ring disposed around said first seat portion at a location adjacent to said first spring portion;
a second sliding piston, having a second seat portion with a second seat diameter smaller than said central diameter and a second spring portion with a second spring portion diameter which is larger than said central diameter and smaller than said second diameter; said second sliding piston disposed in said hollow interior between said metallic ball and said second end;
said second sliding piston comprising a second central void having a second void axis which is substantially co-located with said longitudinal axis;
said second sliding piston having a second orifice through said second seat portion extending a spot on a second outside circumference of said second seat portion into said second central void;
a second "O" ring disposed around said second seat portion at a location adjacent to said second spring portion;
a first spring disposed between said first spring portion and said first end;
a second spring disposed between said second spring portion and said second end;

a first pressure relief channel formed in said first section so as to provide increased capacity for fluid flow when said first "O" ring is pressed to a location along the longitudinal axis so that fluid can freely flow along said first sliding piston and into said first pressure relief channel;
a second pressure relief channel formed in said second section so as to provide increased capacity for fluid flow when said second "O" ring is pressed to a location along the longitudinal axis so that fluid can freely flow along said second sliding piston and into said second pressure relief channel;
a magnet disposed in a slot in said valve body, said magnet sized and located so as to provide magnetic forces which in aggregate tend to pull said metallic ball into a location centrally disposed between said first sliding piston and said second sliding piston; and,
a set screw disposed adjacent said magnet to reposition said magnet to adjust said magnetic forces with respect to said metallic ball.

2. A valve comprising:
a substantially cylindrical valve body comprising a central fluid channel having a plurality of internal sections with each of said plurality of internal sections having a different diameter dimension;
a substantially spherical flow stopper;
a first piston configured to slide in said central fluid channel and sized to create an airflow permitting gap between said first piston and said valve body;
said first piston comprising:
 a member with a central void and a seat configured to at least partially mate with said spherical flow stopper;
 a port extending through said first piston and coupling said airflow permitting gap with the central void in said member;
 a first spring disposed in said valve body to resist movement of said first piston along said central fluid channel;
 a first pressure relief channel disposed in said valve body which is configured to provide a passage for airflow only when said first piston has compressed said first spring by a first predetermined distance;
 wherein said first piston further comprises:
  a ball mating section having a first diameter;
  a first displacement resistance mating section having a second diameter which is larger than said first diameter;
  an "O" ring seal disposed around said ball mating section adjacent to said first displacement resistance mating section, configured to prevent airflow except when said first piston has compressed said first spring by said first predetermined distance; and
 a magnet disposed in said valve body configured for retaining said spherical flow stopper in a predetermined location in the absence of airflow around said spherical flow stopper.

3. The valve of claim 1 further comprising a screw extending into said valve body configured to move a magnet closer to said central fluid channel.

4. The valve of claim 1 further comprising:
a second piston disposed in said central fluid channel;
said second piston configured with a second piston seat for at least partially mating with said spherical flow stopper;
said second piston placed and configured so that air flowing through said second piston passes next around said spherical flow stopper and then through said first piston before exiting said valve body.

5. The valve of claim 4 wherein said second piston further comprises:
a second piston ball mating section having a second piston first diameter;
a second piston displacement resistance mating section having a second piston second diameter which is larger than said second piston first diameter;
a second "O" ring seal disposed around said second piston ball mating section adjacent to said second piston displacement resistance mating section, configured to prevent airflow around said second piston displacement resistance mating section.

6. The valve of claim 5 further comprising:
a second spring disposed in said valve body to resist movement of said second piston along said central fluid channel.

7. The valve of claim 5 further comprising a screw extending into said valve body configured to move said magnet closer to said central fluid channel.

8. The valve of claim 6 wherein said second spring resists movement of said second piston only away from said spherical flow stopper.

9. The valve of claim 8 further comprising:
a second pressure relief channel disposed in said valve body which is configured to provide a passage for airflow only when said second piston has compressed said second spring by a second predetermined distance.

10. A valve comprising:
a valve housing;
a movable stopper for obstructing fluid flow alternately in one of two opposing flow directions;
first seat for mating with the movable stopper so as to obstruct fluid flow in a first direction;
second seat for mating with the movable stopper so as to obstruct fluid flow in a second direction;
said first seat being sized, shaped, located and configured to slide along an axial direction of the valve housing as a function of fluid pressure of a fluid disposed inside said valve housing;
means to resist sliding of said first seat along said axial direction;
a pressure relief fluid flow passage in said valve housing for reducing pressure inside said valve housing when said first seat has been forced to slide to a predetermined seat location along said axial direction;
an adjustable means for applying an adjustable force to tend to hold and return said movable stopper to a central location between said first seat and said second seat;
a fluid flow permitting gap disposed about said first seat to permit fluid to move along said axial direction distally from a point on said first seat which is in closest proximity to said second seat;
a movable seal disposed on said first seat so as to restrict fluid from flowing through said fluid flow permitting gap into said pressure relief fluid flow passage unless said first seat has slid to said predetermined seat location along said axial direction;
an orifice of a predetermined size to permit an orifice flow to occur such that fluid flows through said fluid flow permitting gap, through said orifice, and into a central void in said first seat;
a second seal disposed on said second seat to prohibit fluid from flowing in a gap between said second seat and an adjacent co-axial structure.

11. The valve of claim 10 wherein said adjustable means for applying an adjustable force comprises a magnet and a screw.

12. The valve of claim 11 wherein said movable stopper is substantially spherical.

13. The valve of claim 12 wherein said pressure relief fluid flow passage is a channel formed in a surface of said valve housing.

14. The valve of claim 13 wherein said means to resist sliding is a spring.

15. The valve of claim 14 wherein said second seat is stationary.

16. The valve of claim 14 wherein said second seat is movable and further comprising a second seat spring to resist sliding.

17. The valve of claim 10 wherein said movable stopper comprises a first ball.

18. The valve of claim 17 further comprising a second ball.

19. The valve of claim 18 wherein said means to resist sliding is disposed between said first ball and said second ball.

20. The valve of claim 19 further comprising a third seat configured to mate with said second ball.

* * * * *